(12) United States Patent
Toh

(10) Patent No.: US 6,292,608 B1
(45) Date of Patent: Sep. 18, 2001

(54) LINE SCAN CAMERA

(75) Inventor: Peng Seng Toh, Parc Oasis (SG)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/409,933

(22) Filed: Sep. 30, 1999

(51) Int. Cl.[7] .................................................. G02B 6/26
(52) U.S. Cl. ........................... 385/43; 385/119; 385/120; 356/121; 250/227.11
(58) Field of Search ............................... 385/43, 116, 119, 385/120; 356/121; 250/227.11, 216

(56) References Cited

U.S. PATENT DOCUMENTS

| | | | |
|---|---|---|---|
| 3,918,814 | * 11/1975 | Weiser | 356/138 |
| 5,493,391 | * 2/1996 | Neal et al. | 356/121 |
| 6,064,067 | * 5/2000 | Zhao et al. | 250/353 |

* cited by examiner

*Primary Examiner*—Darren Schuberg
*Assistant Examiner*—Fayez Assaf

(57) ABSTRACT

A line scan apparatus having a linear array of objective lenses which pair up with an associated linear array of optical sensors. The apparatus further comprises a bundle of tapering optical fibers which optically couple the pairs of objective lenses and optical sensors. Each fiber is arranged such that it optically couples at a wide end to one of the objective lens, and at a narrow end to one of the optical sensor. In operation, the linear array of objective lenses are scanned across the object, with the linear array of optical sensors capturing a one dimensional image line by line to build up a two dimensional image of the object.

4 Claims, 6 Drawing Sheets

LINE SCAN CAMERA

This invention relates to a line scan apparatus for scanning an object line by line to build up a digitised image. In particular, the object may be a substrate containing electronic components. Furthermore, the apparatus may form part of an automated optical inspection system for detecting common manufacturing process faults which occur during circuit board assembly.

BACKGROUND OF THE INVENTION

A typical line scan camera comprises a series of discrete optical sensors arranged in a line to form a linear sensor array. An optical arrangement, also forming part of the line scan camera, allows the linear array of optical sensors to form a one dimensional image of a line portion of the object. By scanning the camera relative to the object, so that the line portion moves across the object, a two dimensional image of the object is constructed.

One familiar application of a line scan camera is in the field of scanners. A flat bed scanner, for example, scans a sheet of paper and converts print on the sheet into a digitised image for transmitting to a computer. In this particular application, the object distance is specified by the structure of the scanner since the paper is assumed to be substantially planar and positioned on the "lat bed". Known flat bed scanners take advantage of this feature and employ optical arrangements consisting of a linear array of self focussing (SELFOC™) lenses which relay the content of the paper at a known distance onto a linear array of image sensors. These self focussing lenses are each formed from a short section of optical fibre which are designed to operate at a relatively short, fixed working distance from the object. The self focussing lenses have the advantage of being relatively cheap to manufacture.

This invention relates to the application of a line scan camera in the field of circuit board inspection systems. The aim of these systems is to produce a two dimensional image of the inspected circuit board as viewed directly from above the circuit board, i.e., a plan view. This plan view is then examined to establish if the circuit board has been subject to any manufacturing process faults. Common faults include:

Misaligned parts

Missing components

Excess solder and solder bridges

Rotated and reversed polarity parts

Wrong component size

Component leads that are lifted or bent

A first requirement of these systems is the ability to image three dimensional components mounted on the circuit board surface. As such, the optical arrangement used in these systems is characterised by having a relatively large depth of field. This allows objects raised from the substrate surface and objects on the substrate surface to be imaged in focus during a single scanning operation. A second requirement of these systems is the ability to produce a spatially accurate image of the circuit board to enable repeatable inspection results. As such, the optical arrangement used in these systems is also optimised to minimise imaging errors resulting from geometrical distortions such as lens field curvature, perspective distortion and parallax errors.

FIG. 1 shows a basic layout of an optical arrangement for a circuit board inspection system which is designed to have a relatively large scanning area together with a relatively large depth of field. The apparatus 10 comprises a conventional imaging lens 11, an aperture 12, and an image sensor array 13. The apparatus 10 scans across the substrate or circuit board 15 in the direction of arrow B, imaging a moving line segment A—A. A drawback with this arrangement is that at the ends of the line segment A—A, the lines of sight, represented by the rays R in FIG. 1, are not perpendicular to the substrate surface. This results in parallax errors. FIG. 2 illustrates in enlarged detail such a parallax error occurring in the end region of the line segment A—A. The ray labelled R is a line of sight to the optical arrangement 10, and is incident at an angle α to the plane of the substrate surface. Because the line of sight is riot perpendicular to the substrate surface, the relatively tall component 22 causes the hashed region S to be in shadow. Consequently, a portion of a neighbouring component 24 is obscured so that imaging information of this portion cannot be captured by the inspection system.

The inspection system addresses the problem of parallax by using telecentric lenses in place of the conventional imaging lens 11 and by limiting the scanning area. Unfortunately, this increases the cost of the system and slows down scanning time of the complete circuit board which is undesirable.

SUMMARY OF THE INVENTION

The present invention provides a line scanning apparatus with improved telecentricity whilst maintaining sufficient depth of field. This invention allows objects at a range of distances, such as different heights of components on a circuit board, to remain focussed during a scanning operation. The present invention may also provide an optical arrangement that reduces the object to generate an image which may be sensed by an array of optical sensors.

In accordance with the present invention there is provided a line scan apparatus which comprises a linear array of objective lenses which pair up with an associated linear array of optical sensors. The apparatus further comprises a bundle of tapering optical fibres which optically couple the pairs of objective lenses and optical sensors. Each fibre is arranged such that it optically couples at a wide end to one of the objective lens, and at a narrow end to one of the optical sensor. In operation, the linear array of objective lenses are scanned across the object, with the linear array of optical sensors capturing a one dimensional image line by line to build up a two dimensional image of the object.

Alternatively, in accordance with the present invention there is provided a line scan apparatus comprising a plurality of pixel detecting elements, each pixel detecting element including an objective lens, an optical sensor, and a tapering optical fibre arranged such that a wide end optically couples with the objective lens and a narrow end optically couples with the optical sensor. These pixel detecting elements are arranged such that the optical lenses are disposed in a linear array so that together the pixel detecting elements form a line detecting element which may be scanned across the object.

The tapering fibres have the advantageous effect of redistributing each element in the optical sensor array directly above the patch of the object (pixel) to be viewed. Thus, each element of the optical sensor array is aligned perpendicularly with a lens and a patch of the object to be imaged. In this way, geometrical distortion such as field curvature and perspective distortion can be minimised.

The tapering fibres also have the advantageous effect of enlarging the sensing area of each element in the optical sensor. The lens associated with this enlarged area provides a depth of field so that the apparatus may operate at a range of working distances. Accordingly, the apparatus is able to image three dimensional objects on a surface such as components on a circuit board substrate.

Preferably, the line scan apparatus includes a mask disposed adjacent the linear array of lenses. This mask defines a plurality of light transmitting regions aligned with each of the lenses. Suitably, the line scan apparatus includes a second mask disposed adjacent the linear array of lenses on the opposite side of the lens array from the first mask.

The extent and scope of the present invention is defined in the appended Claims to which reference should now be made.

DETAILED DESCRIPTION OF SPECIFIC EMBODIMENTS OF THE INVENTION

Figure 6:
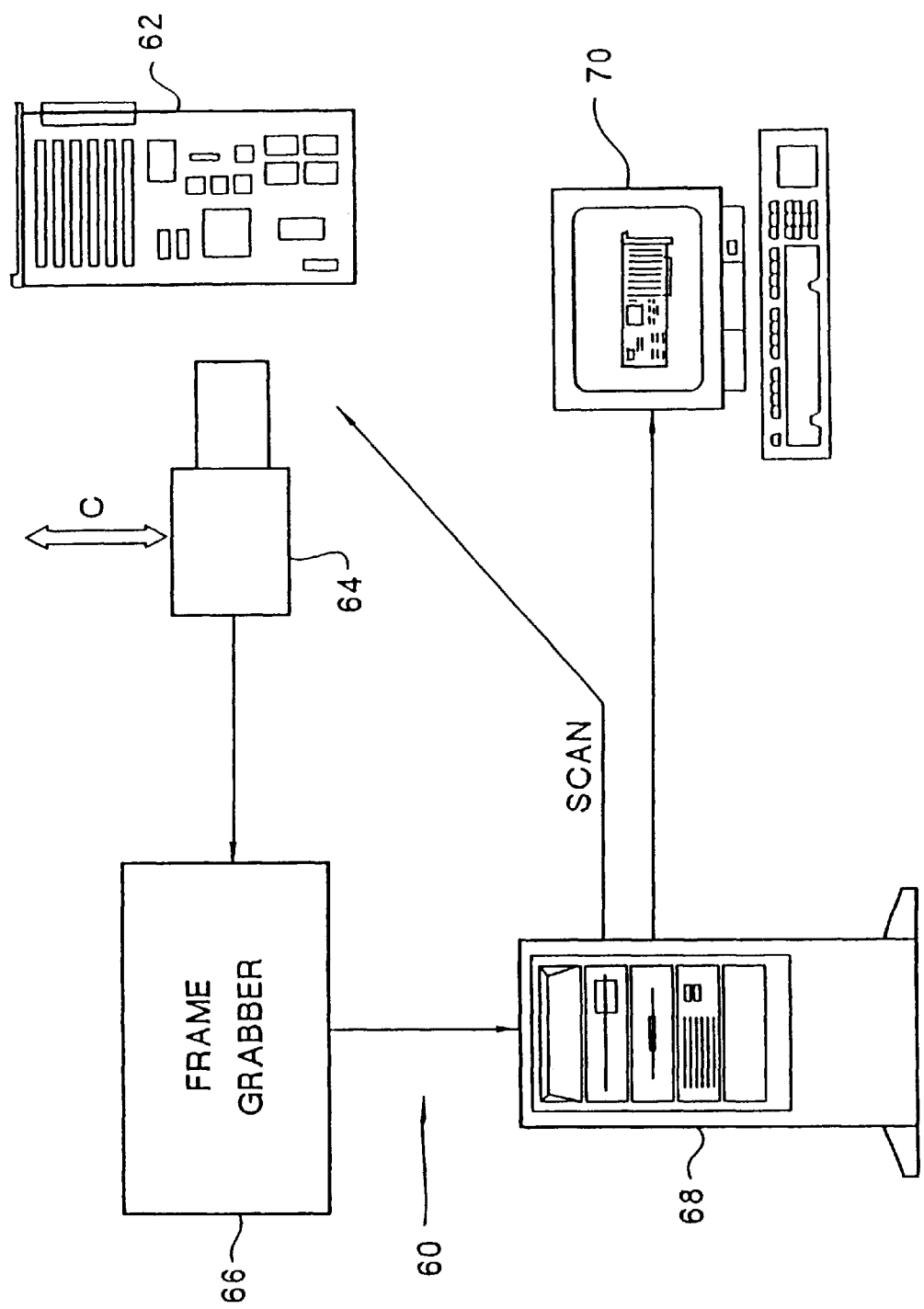
FIG. 6 is a block diagram of the basic layout of an optical circuit board inspection system.

FIG. 6 shows the basic layout of a circuit board inspection system 60 for inspecting a circuit board 62. The system operates as follows. The circuit board 62 is scanned by the line scan camera 64 along an axis indicated by the arrow C. The scanning operation involves movement of the line scan camera relative to the circuit board, which is controlled by a computer 68 via a control line "SCAN". The scanning operation involves moving the camera whilst keeping the circuit board stationary. Alternatively, the camera may remain stationary whilst moving the circuit board, or both the camera and the circuit board may be moved relative to one another.

The line-sensing elements of the line scan camera 64 generate digital signals representative of scanned image lines of the circuit board surface. These digital signals are output to a frame grabber device 66 which processes the digital signals, piecing together the image lines to form a complete image or frame. The complete digitised image is then input to image processing software in the computer 68. The image processing application may process the circuit board image to enhance the image, perform comparisons which expected results, or perform qualitative measurements of the image. The results of the image processing may be recorded in a storage medium or displayed in real-time to an operator via a monitor screen 70.

Figure 1:
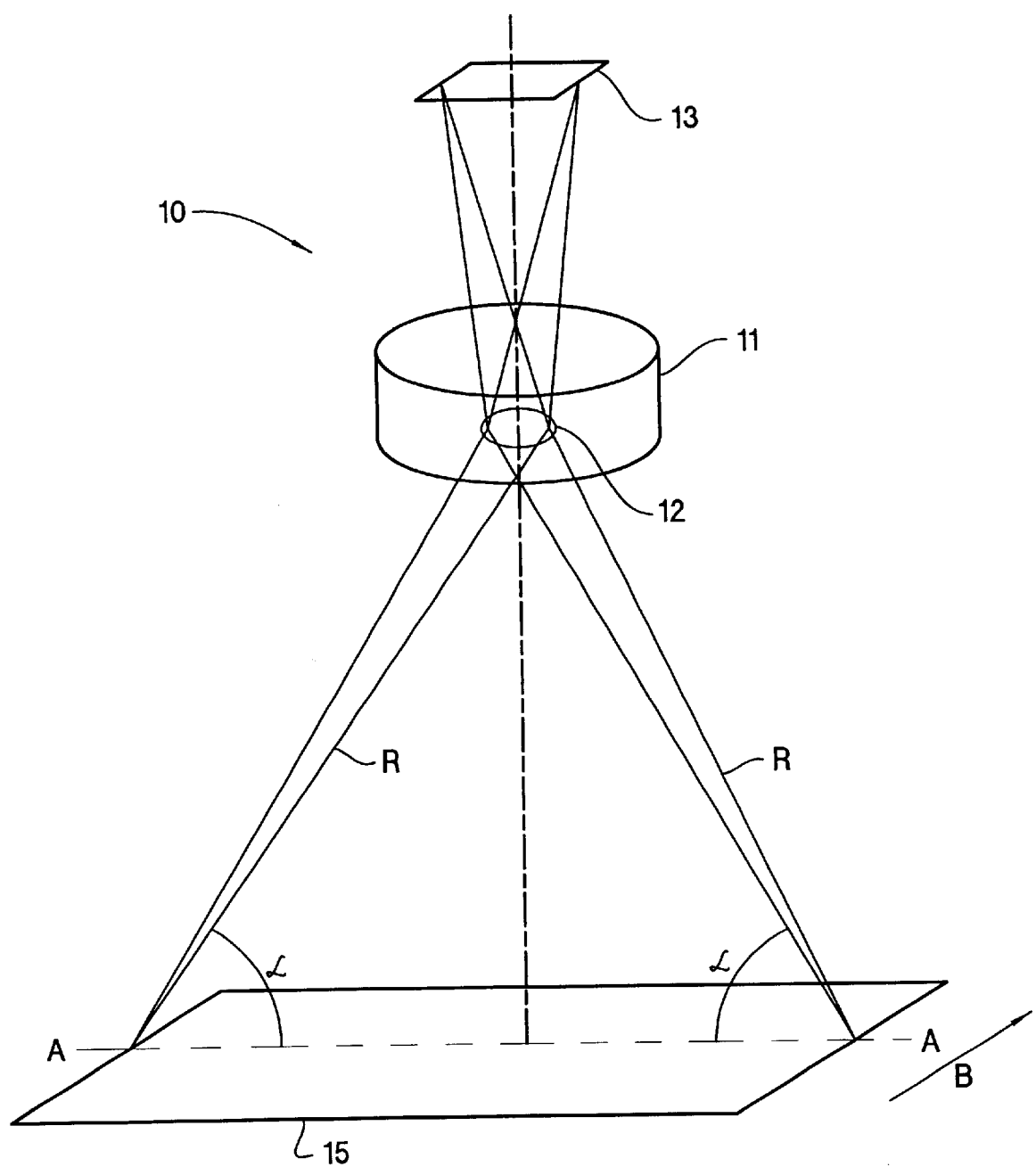
FIG. 1 is a diagram showing the basic layout of an optical arrangement for a circuit board inspection system.
Figure 2:
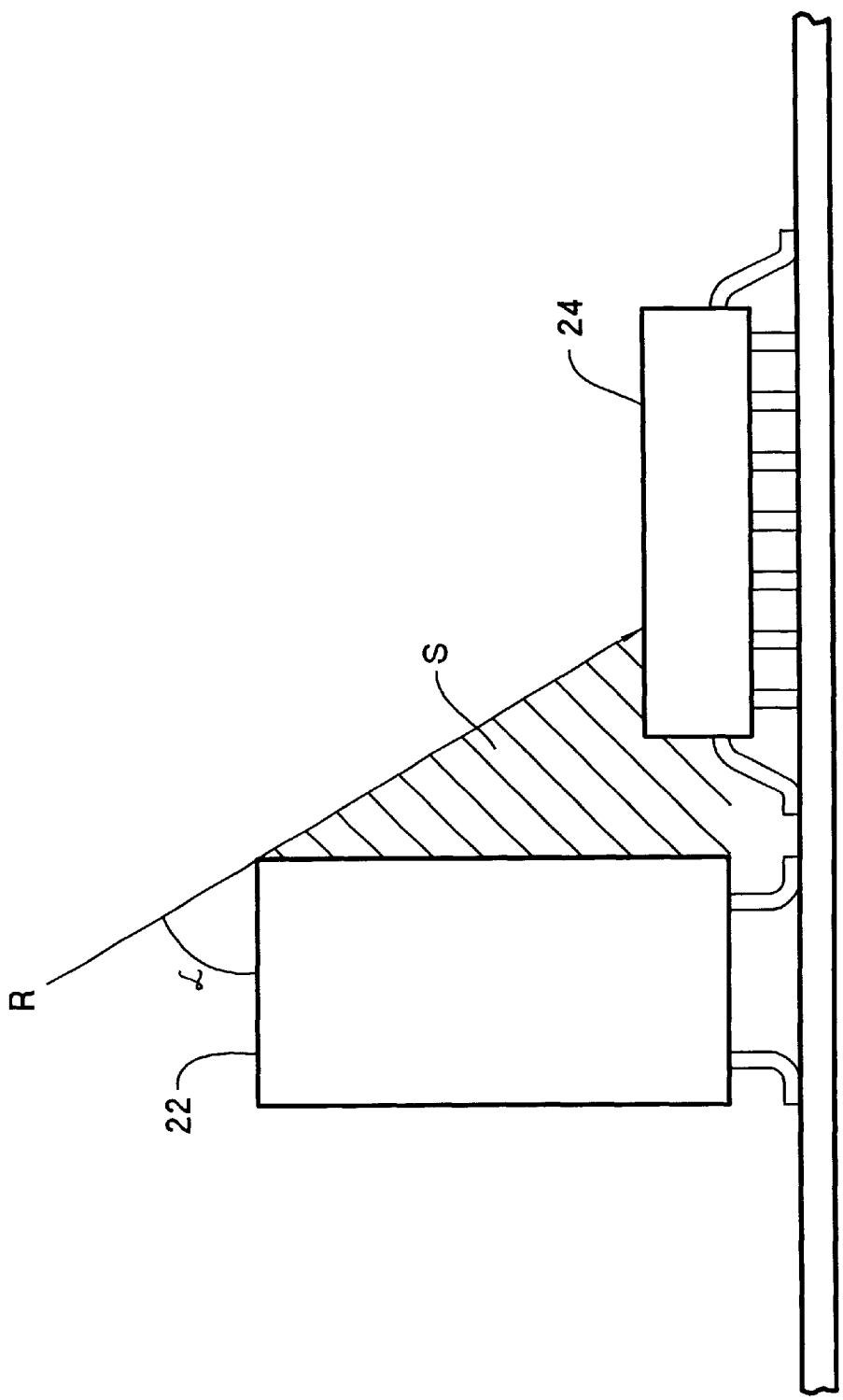
FIG. 2 is an enlarged side view of a circuit board showing one component obscuring part of another component.
Figure 3:
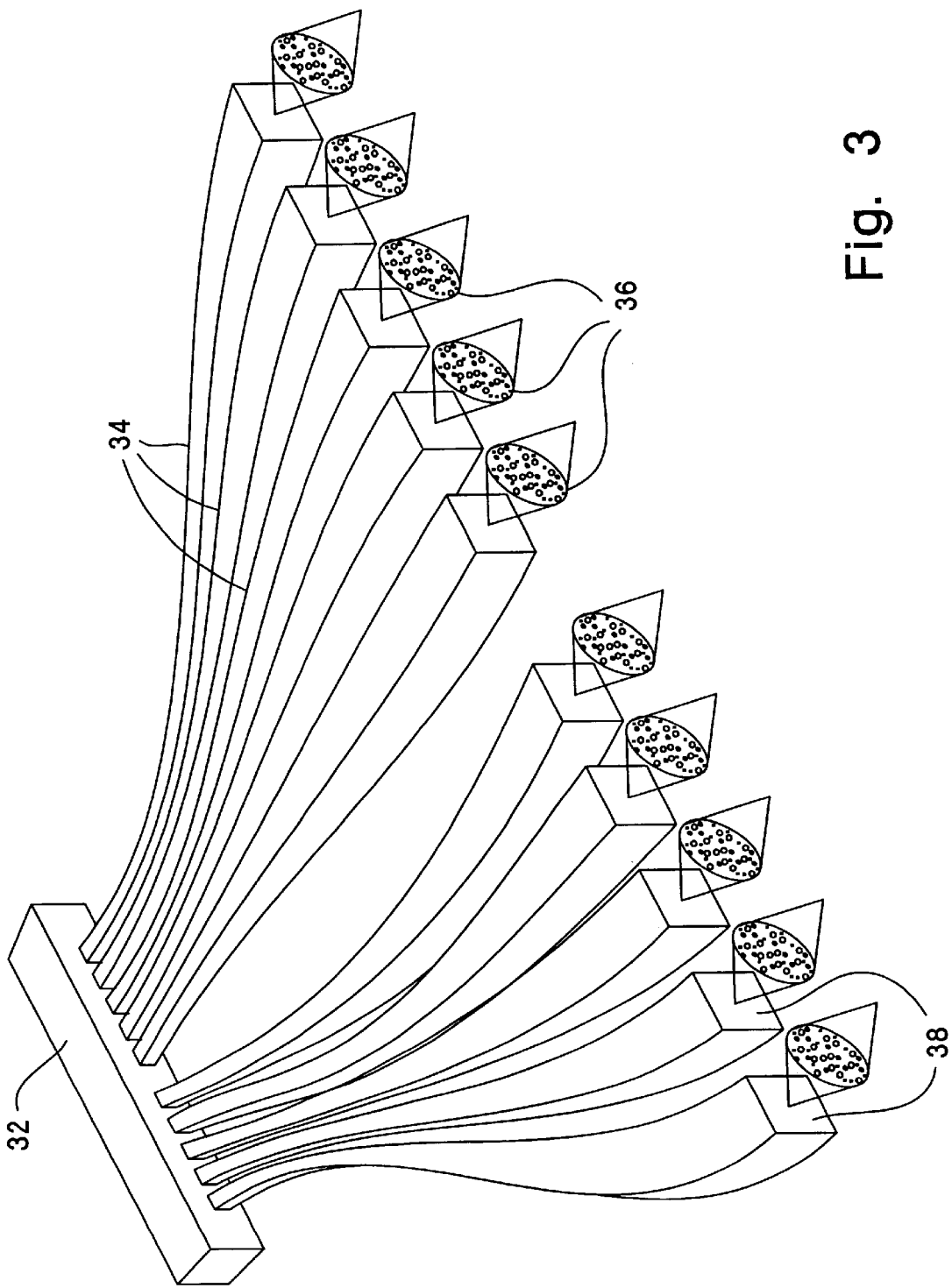
FIG. 3 is a perspective diagram showing the basic elements of a line scan camera in accordance with the invention.

The basic elements of the line scan camera 62 are shown in the perspective diagram of FIG. 3. The elements consist of an array of optical sensors 32, an arrangement of tapering optical fibres 34, and an array of micro-lenses 36.

The array of optical sensors 32 may be an array of photocells, an array of charge coupled devices (CCDs), or any other suitable sensor for detecting light in the visible, infra-red and/or ultraviolet regions of the electromagnetic spectrum. These optical sensors are equivalent to the optical sensors used in known line scan cameras. The array has a width of one element and a length ranging from tens of elements to thousands of elements. The number of elements per unit length will determine the image resolution capability in the direction of the line scan. In this exemplary embodiment there are only ten optical sensors, each having a square detection area of 10 microns by 10 microns.

A tapering fibre 34 is assigned to each of the optical sensors 32. Each fibre 34 tapers to a narrow end and has an end surface shaped and dimensioned the same as the detection area of the optical sensors. Accordingly, each fibre is aligned so that the relatively smaller end surface abuts, in a face-to-face relationship with the detection area of the optical sensor. In this way, the pairs of tapering fibres and optical sensors become optically coupled with each other so that light travelling down a fibre in the direction of the taper is transmitted and projected onto the detection area of the respective optical sensor. The fibres extend normally to the detection area of the optical sensors. Light is received by the tapering fibres at a second wide end, through a relatively larger end surface 38. Like the narrow end surface of the fibre, this wide end surface also has a square shape, and the tapering fibre may be referred to as a square-to-square fibre. Alternatively, the wide end surface of the fibre could be circular, and in this case the tapering fibre may be referred to as a square-to-round fibre. The wide end surface may be, for example, 20 to 50 microns wide. The tapering fibre operates by receiving light through the relatively large end surface, transmitting the light along the fibre, and transmitting the light out through the relatively small end surface to the optical sensor. The increase in cross-sectional area of each fibre away from the optical sensors increases the perceived size of the detection areas, and proportionally decreases the effective spatial resolution of the optical sensor.

The tapering fibres may be fused to form a single part, custom manufactured for use with this embodiment of the invention. This custom manufacturing may be provided by a fibre optics fabricator, for example, Schott Fibre Optics Inc, Massachusetts, USA.

An array of microlenses are arranged in a line in front of the wide ends of the tapering fibres. A single microlens is assigned to each fibre which in turn is assigned to each optical sensor. The microlenses are diffractive microlenses which may be fabricated, for example, by Digital Optical Corporation of North Carolina, USA. The diffractive microlenses are aligned so that they focus light onto the end surfaces of the fibres.

Figure 4:
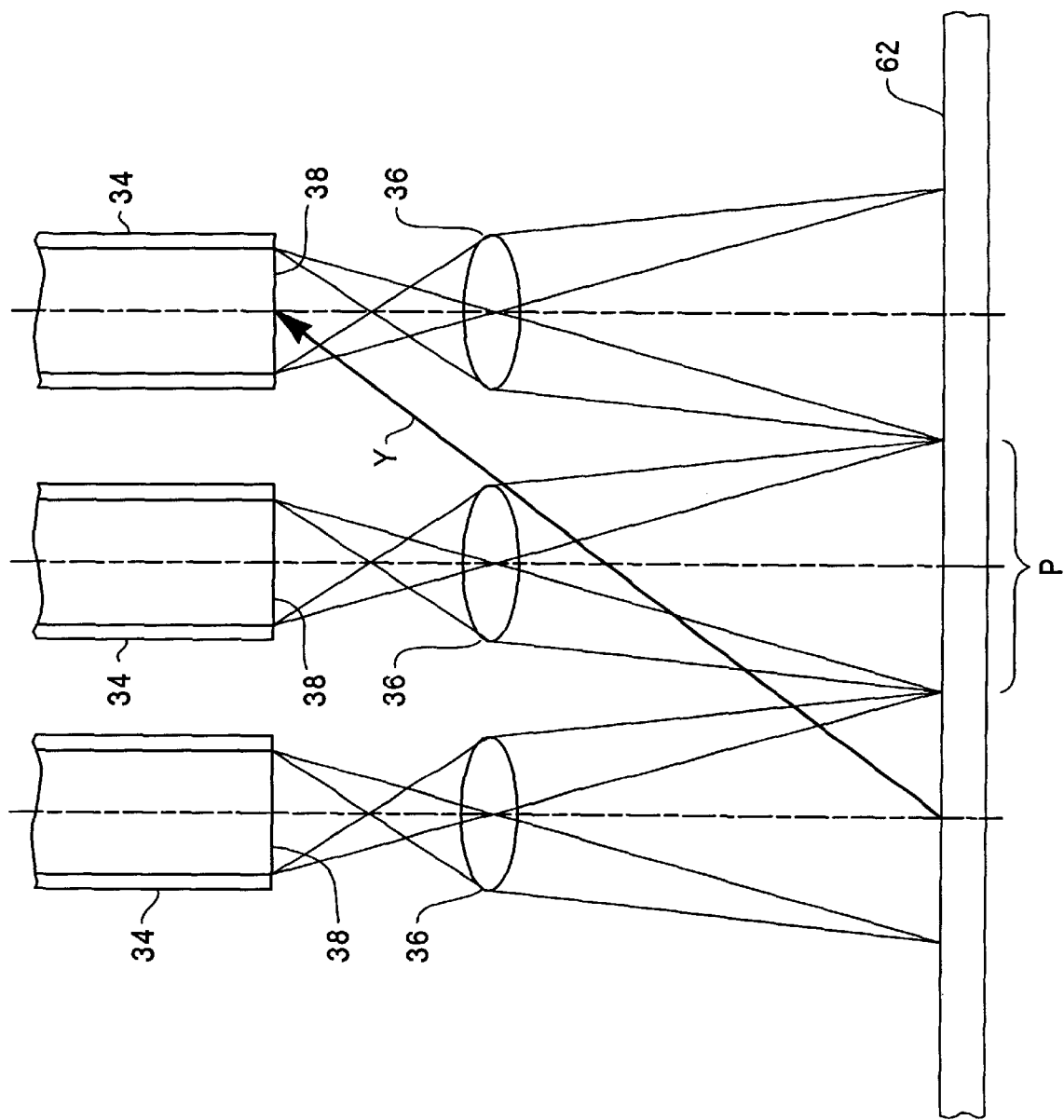
FIG. 4 is a cross-sectional side view of part of the line scan camera of FIG. 3 and a portion of an inspected circuit board.

In FIG. 4, the alignment of the microlenses and the wide end of the tapering fibres is shown in greater detail. Each microlens focuses light from a distinct area on the circuit board 62 surface to the end surface 38 of the associated tapering fibre 38. These distinct areas may be referred to generally as object patches or pixels. For the central lens in FIG. 4 the object patch is indicated by the label P which is, for example, 30 to 60 microns wide. Light rays from the boundary points between the object patches are shown focussed by the lenses 36 to the edges of the end surfaces 38 for transmission down the fibres 34. Light rays within the patch P are also focussed by the lenses onto the end surfaces between the edges.

The end surface of a fibre and the associated lens thus define a patch P on the object surface.

The combination of imaging all the patches using all the lenses 36 provides a complete line image of the circuit board surface 62 distributed across the end surfaces 38 of the fibres. The lenses are arranged such that the linear magnification is slightly less than 1, and results in the object patch P being minimised to the slightly smaller end surface area. This means that the fibres may be arranged as in FIG. 4 with gaps between the fibres. The tapering of the fibres themselves further minimises or reduces the area of the image to the detection area of the optical sensors.

The increased area of the light receiving end of the tapering fibre relative to the narrow end provides a benefit of enabling an increased amount of light to be received by the fibre. This improves the contrast resolution of the line scan camera. Another more significant benefit is the improvement in the depth of field of the camera. In FIG. 4, the circuit board surface is shown flat. In practice, however, components mounted on the circuit board are raised from the circuit board surface by up to 10 millimetres, giving the circuit board a three dimensional appearance. These raised components also need to be imaged. On account of the resolution limit of the camera, which is determined by the combination of the optical sensors and tapering fibres, there will be an associate depth of field for the camera. This depth of field characteristic specifies the range of distances from the objective lens to the object within which the object may be properly detected. The depth of field D may be calculated using the following equation:

$$D = \frac{2xafc(x-f)}{a^2f^2 - c^2(x-f)^2}$$

In this equation, x is the object distance, a is the diameter of the lens aperture, f is the focal length, and c is the circle of confusion. It can be seen that the depth of field D is proportional to the circle of confusion c. The circle of confusion c is determined in the optical arrangement shown in FIG. 3 by the effective detection area of the optical sensor. Without the tapering fibres, the circle of confusion would be equal to the detection area of the optical sensor. However, use of the tapering fibres increases the effective or perceived detection area by a factor equal to the ratio of the wide end surface area to the narrow end surface are. Consequently, the circle of confusion c will also increase and become equal to the end surface area of the tapering fibres. This in turn leads to a proportional increase in the depth of field.

The optical arrangement of FIG. 4 permits light rays from one object patch to be incident on the end surface of an unassociated fibre. An example of such a light ray is illustrated by the arrow Y in FIG. 4. Light rays of this kind may transmit down the fibre and deteriorate the imaging capability of the camera. This undesirable effect may be termed cross-talk.

Figure 5:
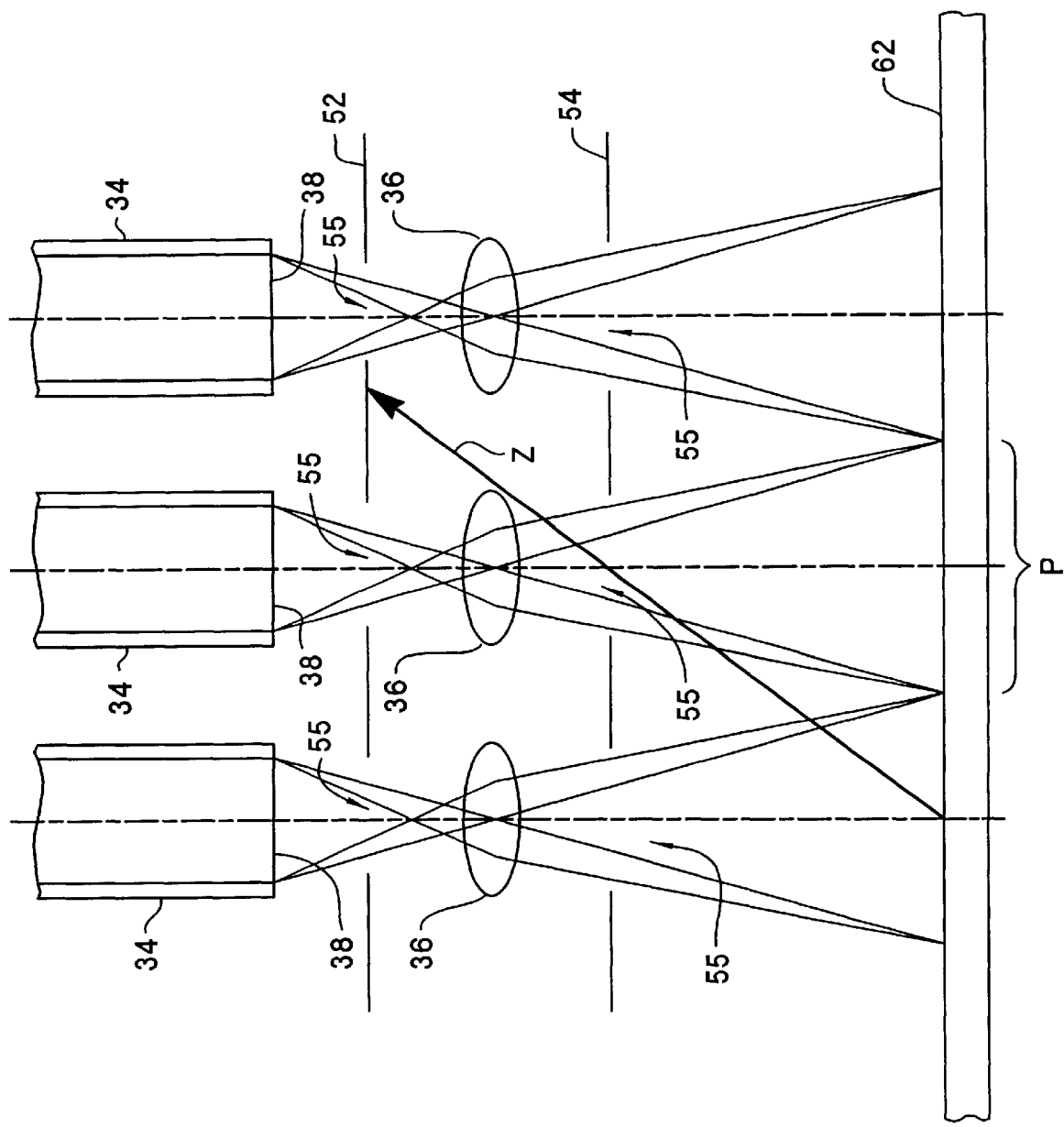
FIG. 5 is a cross-sectional side view similar to that of FIG. 4, but with the camera including a mask which prevents cross-talk.

The optical arrangement shown in FIG. 5 is a modified version of the optical arrangement in FIG. 4 designed to overcome the problem of crosstalk. The modified optical arrangement includes masks above and below the microlenses 36. The upper mask 52 and the lower mask 54 are both formed from light blocking material with a series of apertures 55 spaced at the same interval as the wide ends of the fibres and the microlenses. These apertures 55 permit light from an object patch to be incident only on an associated fibre end 38. The light blocking material from either the upper or lower masks blocks light rays from one patch from reaching the end surface of a nearby fibre. A light ray Z which would otherwise cause cross-talk is shown in FIG. 5 being blocked by the upper mask 52.

What is claimed is:

1. A line scan apparatus for scanning an object line by line to build up a digitised image, the apparatus comprising;

a linear array of objective lenses and an associated linear array of optical sensors, and a bundle of tapering optical fibres optically coupling the objective lenses to the optical sensors, each fibre tapering from a wide end to a narrow end, and the fibres being arranged such that each fibre optically couples at the wide end to an objective lens of said linear array, and optically couples at the narrow end to an optical sensor of said linear array.

2. A line scan apparatus as in claim 1, further comprising a mask disposed adjacent the linear array of lenses, the mask defining a plurality of light transmitting regions aligned with each of the lenses.

3. A line scan apparatus for scanning an object line by line to build up a digitised image, the apparatus comprising;

a plurality of pixel detecting elements, each pixel detecting element including;

an objective lens, an optical sensor, and a tapering optical fibre having a first end tapering to a second end, the fibre being arranged such that the first end optically couples with the objective lens and the second end optically couples with the optical sensor, the pixel detecting elements being arranged such that the objective lenses are disposed in a linear array so that together the pixel detecting elements form a line detecting element.

4. A line scan apparatus as in claim 3, further comprising a mask disposed adjacent the linear array of lenses, the mask defining a plurality of light transmitting regions aligned with each of the lenses.

* * * * *